United States Patent
Gong et al.

(10) Patent No.: US 7,359,858 B2
(45) Date of Patent: Apr. 15, 2008

(54) USER INTERFACE FOR DATA ACCESS AND ENTRY

(75) Inventors: Li Gong, San Francisco, CA (US);
Richard Swan, Portola Valley, CA (US)

(73) Assignee: SAP Aktiengesellschaft, Walldorf (DE)

( * ) Notice: Subject to any disclaimer, the term of this patent is extended or adjusted under 35 U.S.C. 154(b) by 765 days.

(21) Appl. No.: 10/157,030

(22) Filed: May 30, 2002

(65) Prior Publication Data

US 2003/0149563 A1  Aug. 7, 2003

Related U.S. Application Data

(63) Continuation-in-part of application No. 10/131,216, filed on Apr. 25, 2002.

(60) Provisional application No. 60/354,324, filed on Feb. 7, 2002.

(51) Int. Cl.
*G10L 15/18* (2006.01)
*G06F 17/27* (2006.01)
*G06F 17/30* (2006.01)

(52) U.S. Cl. .............. 704/257; 704/9; 707/3

(58) Field of Classification Search ............ 704/9; 379/88

See application file for complete search history.

(56) References Cited

U.S. PATENT DOCUMENTS

| | | | |
|---|---|---|---|
| 5,481,469 A * | 1/1996 | Brasen et al. | 702/60 |
| 5,500,920 A * | 3/1996 | Kupiec | 704/270.1 |
| 5,515,488 A * | 5/1996 | Hoppe et al. | 345/440 |
| 5,734,910 A | 3/1998 | Corrigan et al. | |
| 5,915,001 A * | 6/1999 | Uppaluru | 379/88.22 |
| 5,937,390 A * | 8/1999 | Hyodo | 705/14 |
| 5,945,989 A | 8/1999 | Freishtat et al. | |
| 6,012,030 A | 1/2000 | French-St. George et al. | |
| 6,070,158 A * | 5/2000 | Kirsch et al. | 707/3 |
| 6,070,160 A * | 5/2000 | Geary | 707/4 |
| 6,119,147 A | 9/2000 | Toomey et al. | |
| 6,173,266 B1 | 1/2001 | Marx et al. | |

(Continued)

OTHER PUBLICATIONS

ScanSoft, Inc., Product Listings and Descriptions for Dragon Naturally Speaking and PDsay, 2002, printed from http://www.scansoft.com/ (8 pages).

(Continued)

*Primary Examiner*—David Hudspeth
*Assistant Examiner*—Brian L. Albertalli
(74) *Attorney, Agent, or Firm*—Fish & Richardson P.C.

(57) ABSTRACT

Automatically searching for one or more matches to a search string includes accessing a first part and a second part of a search string. A first search space is searched for a match for the first part of the search string, and a second search space is limited based on a result of searching the first search space. The limited second search space is searched for a match for the second part of the search string. Various approaches are described for structuring a grammar of a voice recognition engine to allow efficient, quick recognition, and to enhance recognition by limiting the amount of the grammar that is searched, thus minimizing the incidence of misrecognition. Search strings can be recognized and searched using a multi-cluster approach. Recognition and searching can also be performed using a multi-level, multi-parameter cascade approach. Approaches can also be applied to recognition of other modes of input.

21 Claims, 7 Drawing Sheets

U.S. PATENT DOCUMENTS

| | | | |
|---|---|---|---|
| 6,289,513 B1 * | 9/2001 | Bentwich | 717/106 |
| 6,330,539 B1 | 12/2001 | Takayama et al. | |
| 6,335,928 B1 * | 1/2002 | Herrmann et al. | 370/352 |
| 6,363,393 B1 | 3/2002 | Ribitzky | |
| 6,377,913 B1 | 4/2002 | Coffman et al. | |
| 6,393,149 B2 * | 5/2002 | Friederich et al. | 382/173 |
| 6,501,832 B1 * | 12/2002 | Saylor et al. | 379/88.04 |
| 6,513,063 B1 | 1/2003 | Julia et al. | |
| 6,523,061 B1 | 2/2003 | Halverston et al. | |
| 6,594,655 B2 * | 7/2003 | Tal et al. | 707/3 |
| 6,643,648 B1 * | 11/2003 | Ross et al. | 707/9 |
| 6,687,734 B1 * | 2/2004 | Sellink et al. | 709/203 |
| 6,738,762 B1 * | 5/2004 | Chen et al. | 707/3 |
| 6,788,768 B1 * | 9/2004 | Saylor et al. | 379/88.13 |
| 2001/0037200 A1 * | 11/2001 | Ogawa et al. | 704/246 |
| 2001/0049603 A1 | 12/2001 | Sravanapudi et al. | |
| 2002/0046209 A1 * | 4/2002 | De Bellis | 707/10 |

OTHER PUBLICATIONS

Hewlett-Packard Company, Cascaded Support Pages, 2002, printed from http://welcome.hp.com/ and linked pages (5 pages).

Hewlett-Packard Company, Customizing an Order with Pull-Down Menus, 2002, printed from http://www.hp.com and linked pages (3 pages).

Amazon.com, Inc., Search Menu for Books, 2002, printed from http://www.amazon.com (2 pages).

Dell Computer Corporation, "Dell Express Path II, Computer Finder," 2002 printed from http://www.dell.com and linked pages (2 pages).

Compaq, "Customize Your Configuration," 2002, printed from http://athome.compaq.com/ and linked pages (5 pages).

Andrew Hunt (editor), "JSpeech Grammar Format," Jun. 2000, printed from http://www.w3.org/TR/2000/NOTE-jsgf-20000605 (31 pages).

Michael Riben, M.D, Speech Recognition Tutorial, Jan. 1999, printed from http://home.nycap.rr.com/voice (50 pages).

Michael Classen, "The Voice of XML," Jun. 2001, printed from http://www.webreference.com (13 pages).

Just van den Broecke, "Pushlets: Send events from servlets to DHTML client browsers," Mar. 2000, printed from http://www.JavaWorld.com (15 pages).

Nuance Communications Inc., "Nuance 8.0 Delivers Lower Costs for Enterprises and Service Providers, Boosts Customer Satisfaction with Superior Accuracy and Personalized Caller Interactions," Jan. 2002, printed from http://www.nuance.com (4 pages).

Nuance Communications Inc., "Nuance Backs W3C for Multi-Modal Applications Standard Setting," Feb. 2002, printed from http://www.nuance.com (2 pages).

Speech Application Language Tags ("SALT") Forum, "Cisco, Comverse, Intel, Microsoft, Philips and SpeechWorks Found Speech Application Language Tags Forum to Develop New Standard For Multimodal and Telephony-Enabled Applications and Services," Oct. 2001, printed from http://www.saltforum.org (5 pages).

Speech Application Language Tags ("SALT") Forum, "The SALT Forum Welcomes Additional Technology Leaders as Contributors," Jan. 2002, printed from http://www.saltforum.org (4 pages).

Speech Application Language Tags ("SALT") Forum, "Speech Application Language Tags (SALT) Technical White Paper," printed from http://www.saltforum.org/downloads (6 pages).

Jonathan Eisenzopf, "Microsoft-led SALT Forum Releases Draft Spec," 2002, printed from http://voicexmlplanet.com/articles/saltspec.html (4 pages).

Jupitermedia Corporation, "KnowNow Debuts with Event Routing Technology," Jun. 2001, printed from http://siliconvalley.internet.com/news/print.php/793671 (2 pages).

KnowNow, Inc., "Library Listing," 2002, printed from htt/://www.knownow.com (1 page).

KnowNow, Inc., "Event Routing vs. Multicasting: Marrying Publish-Subscribe and Internet-Style Routing," 2002, printed from htt/://www.knownow.com (3 pages).

KnowNow, Inc., "Web-Standard Messaging: Using Message Routing for Fast, Simple and Affordable Integration," 2002, printed from htt/://www.knownow.com (4 pages).

KnowNow, Inc., "KnowNow Architecture Overview," 2002, printed from htt/://www.knownow.com (5 pages).

Paaso et al., "A New Environment for Courseware Development, Course Delivery and Training", Proceedings of the ED-Media 97.

Henze et al., "Modeling Constructivist Teaching Functionality and Structure in the KBS Hyperbook System", Jun. 1999.

Jungmann et al., Adaptive Hypertext in Complex Information Spaces, Mar. 1997.

Jin et al., "An Ontology—Aware Authoring Tool-Functional Structure and Guidance Generation".

Siekmann et al., "Adaptive Course Generation and Presentation".

Albert et al., "Adaptive and Dynamic Hypertext Tutoring Systems Based on Knowledge Space Theory".

Ranwez et al., "Description and Constructon of Pedagogical Material Using an Ontology Based DTD".

Max Muhlhauser, "Cooperative Computer-Aided Authoring and Learning" 1995, Kluwer Academic Publishers.

* cited by examiner

USER INTERFACE FOR DATA ACCESS AND ENTRY

CROSS-REFERENCE TO RELATED APPLICATIONS

This application claims priority from (i) U.S. Provisional Application No. 60/354,324, filed Feb. 7, 2002, and titled MOBILE APPLICATION ARCHITECTURE, and (ii) U.S. application Ser. No. 10/131,216, filed Apr. 25, 2002, and titled MULTI-MODAL SYNCHRONIZATION, both of which are hereby incorporated by reference in their entirety for all purposes. This application is a continuation-in-part of U.S. application Ser. No. 10/131,216.

TECHNICAL FIELD

Certain implementations relate generally to a user interface and speech grammar, and more particularly to a user interface and speech grammar for voice-based data access and entry on a mobile device.

BACKGROUND

A user interface may allow a user to gain access to data, such as, for example, products in a catalog database, or to enter data into a system, such as, for example, entering customer information into a customer database. User interfaces are used for applications residing on relatively stationary computing devices, such as desktop computers, as well as for applications residing on mobile computing devices, such as laptops, palmtops, and portable electronic organizers. A voice-activated user interface can be created to provide data access and entry to a system, and voice input may be particularly appealing for mobile devices.

SUMMARY

In various implementations, a grammar for speech recognition for a given voice-driven application, mobile or otherwise, can be written to enable accurate and efficient recognition. Particular implementations described below provide a user interface that allows a user to input data in one or more of a variety of different modes, including, for example, stylus and voice input. Output may also be in one or more of a variety of modes, such as, for example, display or voice. Particular implementations may be used with mobile devices, such as, for example, palmtops, and the combination of voice and stylus input with voice and display output may allow such mobile devices to be more useful to a user. Implementations may also be used with the multi-modal synchronization system described in the incorporated provisional application.

Implementations allow enhanced voice recognition accuracy and/or speed due in part to the use of a structured grammar that allows a grammar to be narrowed to a relevant part for a particular voice recognition operation. For example, narrowing of the grammar for a voice recognition operation on a full search string may be achieved by using the results of an earlier, or parallel, voice recognition operation on a component of the fall search string. Other implementations may narrow the grammar by accepting parameters of a search string in a particular order from a user, and, optionally, using the initial parameter(s) to narrow the grammar for subsequent parameters. Examples include (i) reversing the standard order of receiving street address information so that, for example, the country is received before the state and the grammar used to recognize the state is narrowed to the states in the selected country, (ii) segmenting an electronic mail address or web site address so that a user supplies a domain identifier, such as, for example "com," separately, or (iii) automatically inserting the "at sign" and the "dot" into an electronic mail address and only prompting the user for the remaining terms, thus obviating the often complex process of recognizing these spoken characters.

Implementations may also increase recognition accuracy and speed by augmenting a grammar with possible search strings, or utterances, thus decreasing the likelihood that a voice recognition system will need to identify an entry by its spelling. In such situations, the voice recognition system also obviates the need to ask the user to spell out a term that is not recognized when spoken. For example, after a user enters "com" as a domain identifier in an electronic mail address, the voice recognition system may include, for example, the names of all "Fortune 100" companies and a variety of popular commercial sites in the grammar for the server identifier of the electronic mail address. Thus, if the user then enters "amazon" as the server identifier, and if "amazon" has been included in the grammar, the system will recognize the entry without having to ask the user to spell it out.

Implementations also allow enhanced database searching. This may be achieved, for example, by using a structured grammar and associating grammar entries with specific database entries. In this manner, when the structured grammar is used to recognize the search string, then particular database entries or relevant portions of the database may be identified at the same time.

According to one general aspect, automatically searching for one or more matches to a search string includes accessing a first part and a second part of a search string. A first search space is searched for a match for the first part of the search string, and a second search space is limited based on a result of searching the first search space. The limited second search space is searched for a match for the second part of the search string.

Searching the first search space may include searching a database. Searching the limited second search space may include searching at least part of the database. Limiting the second search space may include limiting the part of the database that is searched to database entries that include a match for the first part of the search string, thus allowing a quicker search compared to searching the full database. The second part of the search string may include a voice input or a manual input. Searching the first search space and searching the limited second search space may be performed at least partially in parallel. The search string may include an address.

Accessing the first part of the search string may include accessing a voice input. Searching the first search space for the match may include performing voice recognition on the first part of the search string. Accessing at least the second part of the search string may include accessing the voice input. Limiting the second search space may include limiting the second search space to grammar entries associated with the first part of the search string. Searching the limited second search space may include performing voice recognition on at least the second part of the search string using the limited second search space, thereby allowing enhanced voice recognition of the second part of the search string compared to performing voice recognition using the unlimited second search space.

The grammar entries associated with the first part of the search string may include grammar entries for full search strings, each full search string including the first part of the search string. The grammar entries associated with the first part of the search string may include grammar entries for components of a fall search string, each component being part of a full search string that includes the first part. Performing voice recognition on the first part may produce a recognized string, and the recognized string may be associated with a set of recognizable search strings from the search space. Limiting the second search space may include limiting the second search space to the set of recognizable search strings or components thereof. Performing voice recognition on the second part of the voice input may include comparing the second part to a set of high-occurrence patterns in the limited second search space, followed by comparing the second part to a set of low-occurrence patterns in the limited second search space. Voice recognition may be performed on the entire voice input using a third search space. The third search space may be limited based on the result from performing voice recognition on the first part of the voice input and based on a result from performing voice recognition on at least the second part of the voice input.

The first part of the search string may be associated with a set of searchable entries, and each entry in the limited second search space may be associated with one or more entries in the set of searchable entries. A first set of options may be provided to a user, the first set of options relating to the first part of the search string, and being provided to the user in a page. Accessing at least the first part of the search string may include accepting a first input from the user, the first input being selected from the first set of options. Limiting the second search space may include limiting a second set of options based on the accepted first input, the second set of options relating to the second part of the search string. The second set of options may be provided to the user in the page, such that the user is presented with a single page that provides the first set of options and the second set of options. Accessing at least the second part of the search string may include accepting a second input from the user, the second input being selected from the second set of options.

Accepting the first input may include accepting a first voice input and performing voice recognition on the first input, wherein performing voice recognition on the first input in isolation allows enhanced voice recognition compared to performing voice recognition on the search string. The first set of options may include manufacturer designations and the second set of options may include product designations from a manufacturer designated by the first input. The search string may include an address.

Accepting the first input may include receiving the first input auditorily from the user. Voice recognition may be performed on the first input in isolation, wherein performing voice recognition on the first input in isolation allows enhanced voice recognition compared to performing voice recognition on the search string. Providing the second set of options may include searching a set of data items for the first input and including in the second set of options references only to those data items, from the set of data items, that include the first input. Accepting the second input may include receiving the second input auditorily from the user. Voice recognition may be performed on the second input in isolation, wherein performing voice recognition on the second input in isolation allows enhanced voice recognition compared to performing voice recognition on the search string.

A third set of options may be provided to the user, the third set of options relating to a third part of the search string and being provided to the user in the page. A third input may be accepted from the user, the third input being selected from the third set of options, wherein the second set of options that is provided to the user is also based on the accepted third input. The second set of options may be modified based on the third input. The first set of options may include manufacturer designations. The third set of options may include price range designations. The second set of options may include product designations from a manufacturer designated by the first input in a price range designated by the third input.

The details of one or more implementations are set forth in the accompanying drawings and the description below. Other features will be apparent from the description and the drawings, and from the claims.

DETAILED DESCRIPTION

Various implementations include a user interface that provides a user with access to data. These user interfaces may be designed to accept various modes of input and to deliver various modes of output. Examples of input and output modes include manual, visual (for example, display or print), auditory (for example, voice or alarms), haptic, pressure, temperature, and smell. Manual modes may include, for example, keyboard, stylus, keypad, button, mouse, touch (for example, touch screen), and other hand inputs. Certain implementations are particularly suited for mobile applications, for which stylus or voice input is preferred, and for which output is presented visually on the screen and/or auditorily with text-to-speech or recorded human speech.

Various implementations also make use of structured grammars for voice recognition. The structured grammars may allow for quicker recognition, for quicker searching for an item in a corresponding database, and/or for enhanced voice recognition due to the decreased likelihood of mis-recognizing a voice input.

Figure 1:
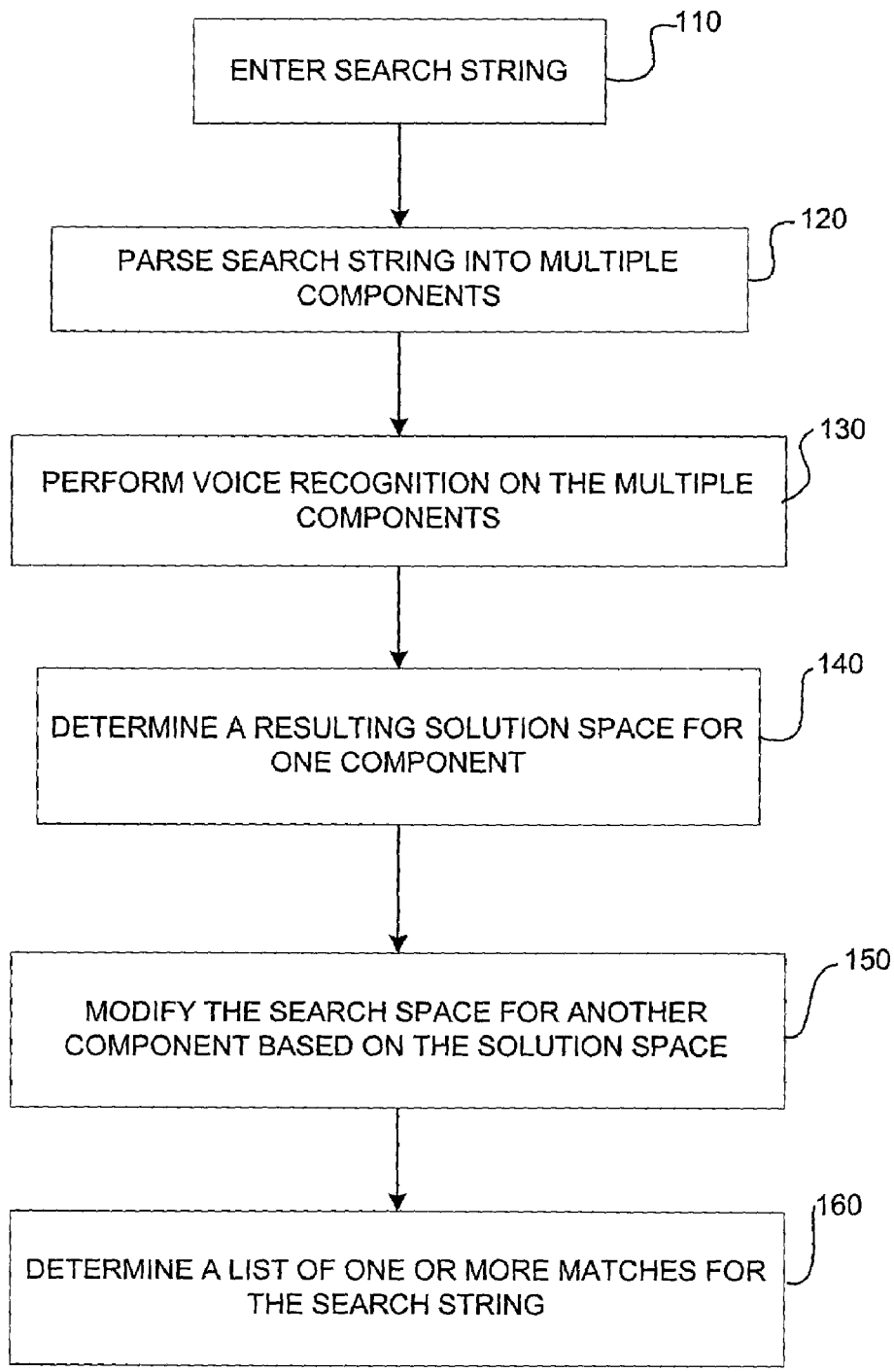
FIG. 1 is a flow chart of a process for recognizing a search string using a multi-cluster approach.

Referring to FIG. 1, a process 100 for recognizing a search string using a multi-cluster approach includes entering a search string using a voice input (110). The search string may represent, for example, an item in a database that a user wants to find. For example, the user may enter "Sony laptop superslim 505Z" into a voice recognition engine of a computer database to pull up information on that (hypothetical) computer model. As explained, the grammar is structured around the database entries, including the actual database entries, or keywords, etc., and possibly also including additional category descriptions and other vocabulary entries.

The process 100 includes parsing the entered search string into at least one component in addition to the full search string (120). The fall search string is also referred to as a component. A component may be a word or other recognized symbol, or group of words or symbols. The search string may be parsed into all of its components, or a single component may be parsed out. Parsing may be performed by recognizing silence between words, symbols, or other components, and the voice entry system may require such silence. Parsing may also be performed on voice inputs entered in a more natural delivery, without obvious pauses between components.

The process 100 includes performing voice recognition on at least two components (130). The parsing (120) may be performed simultaneously while performing the voice recognition (130). For example, as the search string is processed from left to right, for example, a component may be recognized (130) and, upon recognition, may be parsed (120). One of the two components may be the full search string.

The process 100 includes determining a resulting solution space in the grammar for at least one of the voice recognition operations (140). The solution space represents possible matches for the full search string. For example, the first component may be the first word of the search string, for example, "Sony," and may correspond to a cluster in the speech recognition grammar. This cluster defined by "Sony" may contain, perhaps, only one hundred entries out of tens of thousands of entries in the grammar (and the corresponding database). Those one hundred entries would form the solution space for the component "Sony."

The process 100 includes modifying the search space for the voice recognition operation (130) of at least one of the components using the solution space determined in operation 140 (150). Continuing with the example from above, if the full search string is "Sony laptop superslim 505Z, " then the search space being used to perform the voice recognition on the full string can be narrowed to include only the one hundred grammar entries that include the component "Sony."

By narrowing the search space, one or more advantages may be realized in particular implementations. For example, by narrowing the search space, the complexity of the searched-grammar, and the size of the searched vocabulary may be reduced, which may enhance recognition accuracy. Further, the speed of the recognition process may be increased.

In one implementation, both recognition processes (130) are performed at least partially in parallel and recognizing the smaller component, such as "Sony," is faster than recognizing the entire search string. As a result, the recognition process for the fall search string is started on the entire search space of grammar entries and is narrowed after the resulting solution space for the smaller component is determined in operation 140. Other implementations perform the voice recognition processes serially. For example, one implementation performs voice recognition on a smaller component, and afterwards performs voice recognition for a larger component using the smaller component's solution space as the search space for the larger component.

The process 100 includes determining a list of one or more matches for the full search string (160). Voice recognition algorithms often return confidence scores associated with the results. These confidence scores can be used, for example, to rank order the results and a selected number of the highest scoring results can be returned to the user.

The list of matches might not necessarily be good matches. Various implementations may use a threshold confidence score to determine if a good match has been found. If a good match has not been found, then a variety of options are available. For example, (i) the user may be prompted for more information, (ii) the search string may be modified automatically, if it has not already been, by, for example, using synonyms of recognized components, transposing components, etc., or (iii) the user may be presented with information on the size of the solution space for each component, and the confidence scores, which may reveal a component that the system had a difficult time recognizing.

Figure 2:
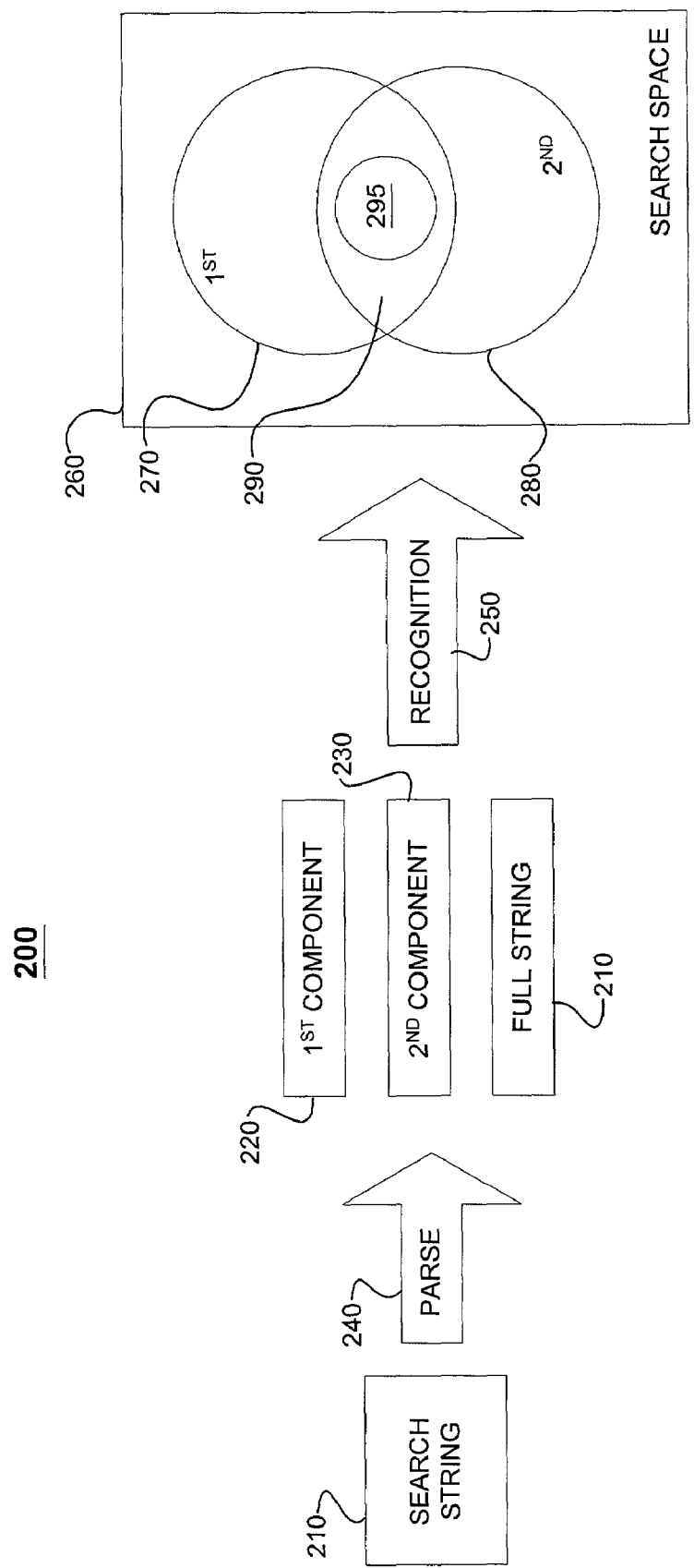
FIG. 2 is a diagrammatic flow chart depicting the process of FIG. 1.

Referring to FIG. 2, a diagrammatic flow chart 200 depicting the process 100 includes a search string 210. The search string 210 includes a first component 220 and a second component 230. The search string 210 may be, for example, a voice segment. The search string 210 is parsed using a parse process 240 into the first and second components 220, 230. A voice recognition process 250 is performed on each component 210, 220, 230, in parallel, using a search space 260. The parse process 240 and the voice recognition process 250 may be implemented using, for example, a processor or other computing device or combination of devices.

Voice recognition of the first component 220 results in a first solution space 270. Assuming that voice recognition of the first component 220 finishes before voice recognition of the second component 230 and of the full string 210, then each of the latter voice recognition operations can be restricted to the first solution space 270.

Voice recognition of the second component 230 results in a second solution space 280. Assuming that voice recognition of the second component 230 finishes before voice recognition of the full string 210, then voice recognition of the full string 210 can be restricted to an overlap 290 of the first solution space 270 and the second solution space 280. Voice recognition of the full string 210 results in a third solution space 295.

The time required for performing voice recognition on a small component can be decreased by structuring the grammar so that common components of the database entries (which are included in the grammar) are compared with the components of the search string before other components of the database entries (which are also included in the grammar). Further, common components may be entered as separate vocabulary entries in a grammar, even though those components do not constitute complete database entries. For example, the word "Sony" may be entered into the vocabulary even though it does not refer to an individual product (database entry). The component "Sony" can then be associated with all of the grammar entries that include the word "Sony" and that correspond to complete database entries. The same can be done for the individual word "laptop," as well as the two-word component "Sony laptop," for example. Such a structure may allow for relatively quick recognition of the component "Sony laptop" and a corresponding narrowing of the search space for the recognition of the full search string "Sony laptop superslim 505Z."

Note that the list of matches determined in the process 100 (160) may return matches that correspond to actual database entries that match the entered search string. Accordingly, in such implementations, the voice recognition process may effectively perform the database search simultaneously. For example, each of the listed matches may serve as an index into the database for easy retrieval of the corresponding database entry.

Other implementations may allow search strings to include components that are not part of the database, however. For example, a user may be allowed to enter a price range for a computer. In such an example, the grammar could include, and be able to recognize, price ranges entered in a determined format. The grammar may be structured in a variety of ways to support recognizing such search strings. For example, if a user enters only a price range, the voice recognition engine may recognize the search string and associate it with a set of database entries satisfying the price range. Alternatively, the voice recognition engine may query the user for more data by, for example, returning a list of manufacturers having computers (computers being the assumed content of the database ultimately being searched) in that price range. If the user enters additional information, such as, for example, a manufacturer, the voice recognition system may use that additional information to narrow the solution space. If the user enters sufficient information, the grammar may be structured to allow the voice recognition system to determine, for the various price ranges that are recognizable, the grammar entries for all actual products (corresponding to actual database entries) that satisfy the entered price range and the other components of the search string. These entries may then be presented to the user.

The process 100 can also be applied to systems that do not use voice input. For example, other modes of input may require a recognition process that could be performed in an analogous manner to that already described.

Figure 3:
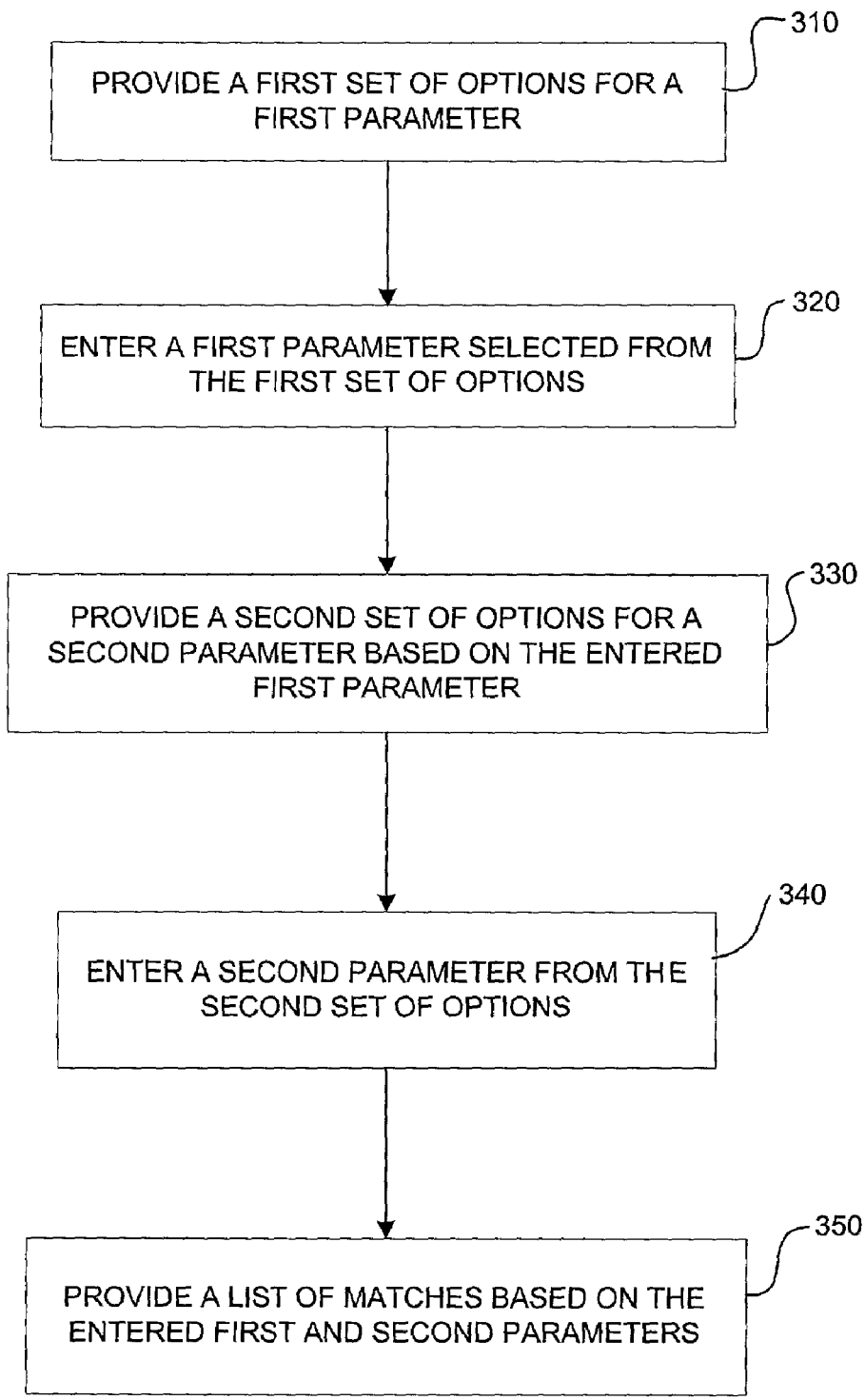
FIG. 3 is a flow chart of a process for performing a search for a search string using a multi-level, multi-parameter cascade approach.

Referring to FIG. 3, a process 300 for performing a search for a search string using a multi-level, multi-parameter cascade approach includes providing a first set of options for a first parameter (310). For example, a user interface to a database of computers may provide a list of manufacturers as the first set of options, with the first parameter being the manufacturer. The first set of options may be provided, for example, on a display, or through a voice response system.

The process 300 includes entering a first parameter selected from the first set of options (320). Continuing the example from above, a user may select, and enter, a manufacturer from a list provided in operation 310. The user may enter the first parameter by using, for example, a stylus, keyboard, touch screen, or voice input.

The process 300 includes providing a second set of options for a second parameter based on the first parameter (330). Continuing the example from above, a user interface may provide a list of product types, including, for example, desktops, laptops, and palmtops, that are available from the manufacturer entered in operation 320.

The process 300 includes entering a second parameter selected from the second set of options (340). Continuing the example from above, a user may select, and enter, a product type from the list provided in operation 330.

The process 300 includes providing a list of matches, based on the first and second parameters (350). Continuing the example from above, the list of matches may include all computers in the database that are manufactured by the entered manufacturer and that are of the entered product type. For example, the list of matches may include all Sony laptops.

The process 300 may be used, for example, instead of having a user enter a one-time, full search phrase. The process 300 presents a set of structured searches or selections from, for example, drop-down lists. The first and second parameters can be considered to be parts of a search string, with the cumulative search string producing the list of matches provided in operation 350. The database may be structured to allow for efficient searches based on the parameters provided in operations 310 and 330. Additionally, in voice input applications, by structuring the data entry, the grammar and vocabulary for each parameter may be simplified, thus potentially increasing recognition accuracy and speed.

Implementations may present multiple parameters and sets of options, and these may be organized into levels. In the process 300, one parameter was used at each of two levels. However, for example, multiple parameters may be presented at a first level, with both entries determining the list of options presented for additional multiple parameters at a second level, and with all entries determining a list of matches. Such parameters may include, for example, manufacturer, brand, product type, price range, and a variety of features of the products in the product type. Examples of features for computers include processor speed, amount of random access memory, storage capacity of a hard disk, video card speed and memory, and service contract options.

Figure 4:
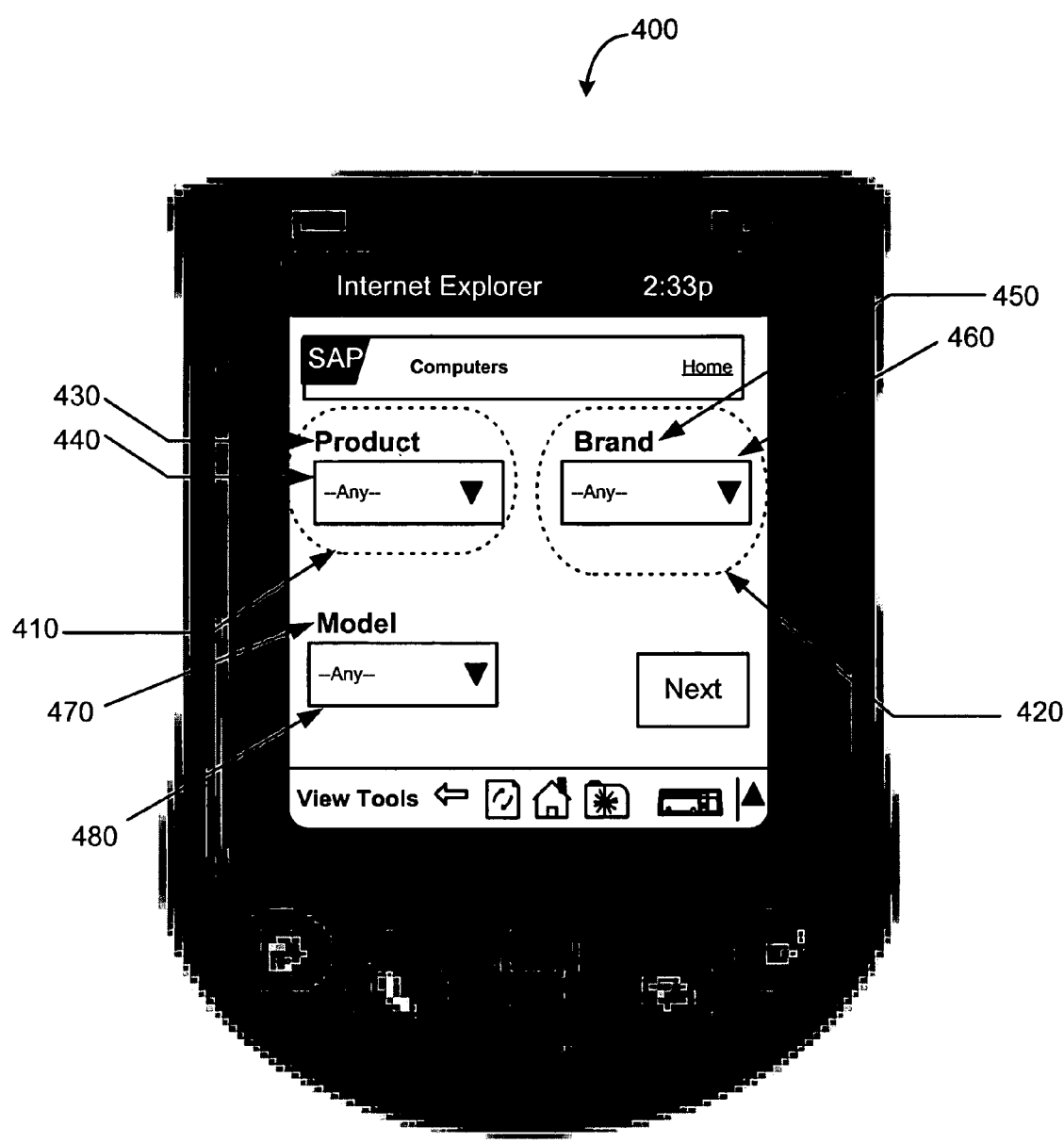
FIG. 4 is a picture of a page for implementing the process of FIG. 3.

Referring to FIG. 4, a picture of a page 400 for implementing the process 300 includes a first level 410 and a second level 420. The first level 410 provides a first parameter 430 for the product, with a corresponding pull-down menu 440 that includes a set of options. The set of options in pull-down menu 440 may include, for example, desktop, laptop, and palmtop. The second level 420 provides a second parameter 450 for the brand, with a corresponding pull-down menu 460 that includes a set of options. The set of options in pull-down menu 460 are all assumed to satisfy the product parameter entered by the user in pull-down menu 440 and may include, for example, Sony, HP/Compaq, Dell, and IBM. Assuming that "laptop" was selected in the pull-down menu 440, then the pull-down menu 460 would only include brands (manufacturers) that sell laptops.

The page 400 also includes a category 470 for models that match the parameters entered in the first and second levels 410 and 420. The matching models are viewable using a pull-down menu 480. As the page 400 indicates, all of the search string information as well as the results may be presented in a single page. The page 400 is also presentable in a single screen shot, but other single-page implementations may use, for example, a web page that spans multiple screen lengths and requires scrolling to view all of the information.

Figure 5:
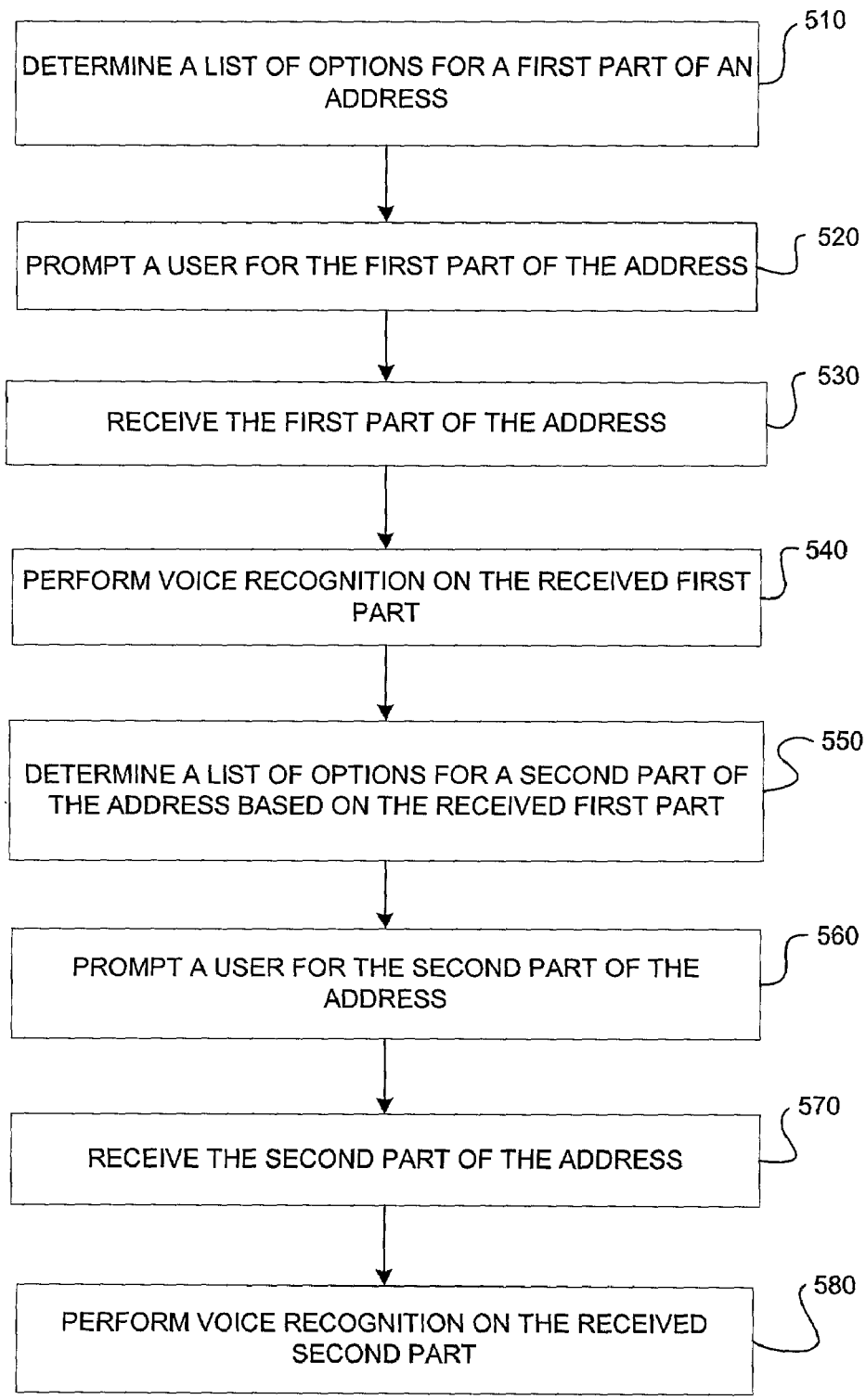
FIG. 5 is a flow chart of a process for recognizing an address.

Referring to FIG. 5, a process 500 for recognizing an address includes determining a list of options for a first part of an address (510). The address may be, for example, a street address or an Internet address, where Internet addresses include, for example, electronic mail addresses and web site addresses. If the address is a street address, the first part may be, for example, a state identifier.

The process 500 includes prompting a user for the first part of the address (520). The prompt may, for example, simply include a request to enter information, or it may include a list of options. The process 500 includes receiving the first part of the address (530). If the first part is received auditorily, the process 500 includes performing voice recognition of the first part of the address (540).

The process 500 includes determining a list of options for a second part of the address based on the received first part (550). Continuing the example from above, the second part may be, for example, a city identifier, and the list of options may include, for example, only those cities that are in the state identified by the received state identifier. By inverting the usual order of state and city in entering street addresses, a voice recognition system can simplify the relevant grammar and vocabulary for the city identifier, thus facilitating enhanced voice recognition accuracy and speed.

The process 500 includes prompting the user for the second part of the address (560). Again, the prompt need not include the list of options. The process 500 includes receiving the second part of the address (570). If the second part is received auditorily, the process 500 includes performing voice recognition of the second part of the address (580).

The process 500 could continue with subsequent determinations of lists of options for further parts of the address. Continuing the example from above, a list of options for a zip code could be determined based on the city identified by the received city identifier. Such a list could be determined from the available zip codes in the identified city. City streets in the city or the zip code could also be determined. Further, country information could be obtained before obtaining state information.

As the above example and the process 500 indicate, the range of possibilities for each subsequent piece of address information can be narrowed by entering the data in an order that is reverse from the ordinary practice, that is, by entering data for geographically broad categories to geographically narrow categories. If multiple countries are concerned, the impact of using the reverse order may be even greater because standard designations for streets varies for different languages.

The process 500 may prompt the user in a number of ways. For example, the user may be prompted to enter address information in a particular order, allowing a system to process the address information as it is entered and to prepare the lists of options. Entry fields for country, state or province, city, zip or postal code, street, etc., for example, may be presented top-down on a screen or sequentially presented in speech output.

Figure 6:
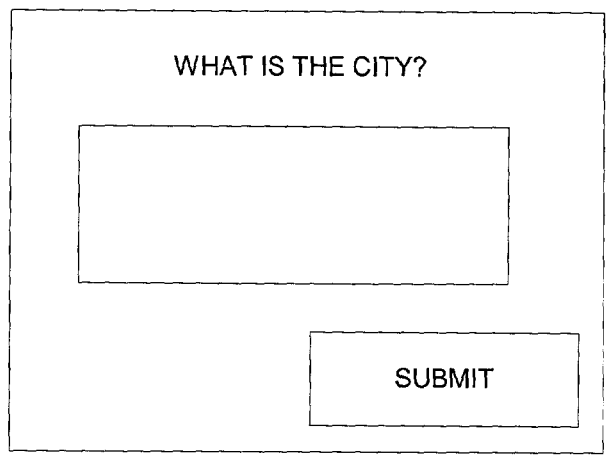
FIG. 6 is a block diagram of a pop-up wizard for entering address information.

Referring to FIG. 6, there is shown another way to prompt the user in the process 500. A system may use a pop-up wizard 600 on the screen of a device to ask the user to enter specific address information. Further, a system may preserve the normative order of address information, but use visual cues, for example, to prompt the user to enter the information in a particular order. Visual cues may include, for example, highlighting or coloring the border or the title of an entry field.

The process 500 may be applied to data entered using a voice mode or another mode. After the data is entered at each prompt, and after it is recognized if voice input is used, a database of addresses may be searched to determine the list of options for the next address field. Such systems allow database searching on an ongoing basis instead of waiting until all address information is entered. Such systems also allow for guided entry using pull-down menus and, with or without guided entry, alerting a user at the time of entry if an invalid entry is made for a particular part of an address.

The process 500 may also be applied to other addresses, in addition to street addresses or parts thereof. For example, the process 500 may be applied to Internet addresses, including, for example, electronic mail addresses and web site addresses.

Figure 7:
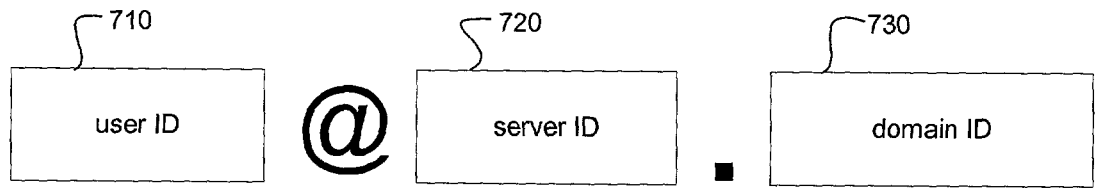
FIG. 7 is a block diagram of a format for entering an electronic mail address.

Referring to FIG. 7, a format 700 for entering an electronic mail address includes using a user identifier 710, a server identifier 720, and a domain identifier 730. The "at sign" separating the user identifier 710 and the server identifier 720, and the "dot" separating the server identifier 720 and the domain identifier 730 may be implicit and inserted automatically, that is, without human intervention.

In one implementation, the domain identifier 730 is entered first due to the small number of options available for this field. A list of options for the server identifier 720 can be generated based on the entered domain. For example, if "com" is entered for the domain, then a list of options for the server identifier 720 may include, for example, all "Fortune 100" companies and the twenty-five most frequently visited commercial web sites. Similar lists may be generated for "gov," "net," and other domain identifiers 730. A list of options for the user identifier 710 may include, for example, common last names and first names and other conventions, such as, for example, a first initial followed by a last name.

Figure 8:
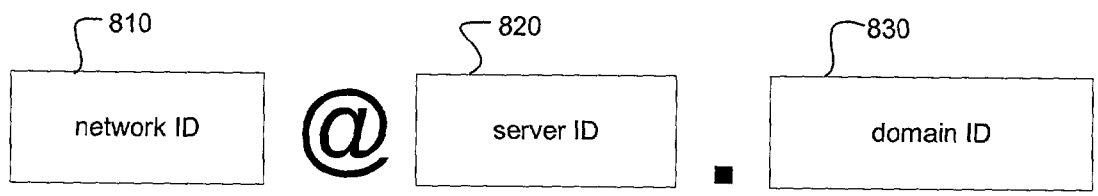
FIG. 8 is a block diagram of a format for entering a web site address.

Referring to FIG. 8, a format 800 for entering a web site address includes using a network identifier 810, a server identifier 820, and a domain identifier 830. The two "dots" separating the three identifiers 810, 820, 830 may be implicit and inserted automatically. The network identifier may be selected from, for example, "www," "www1," "www2," etc.

Figure 9:
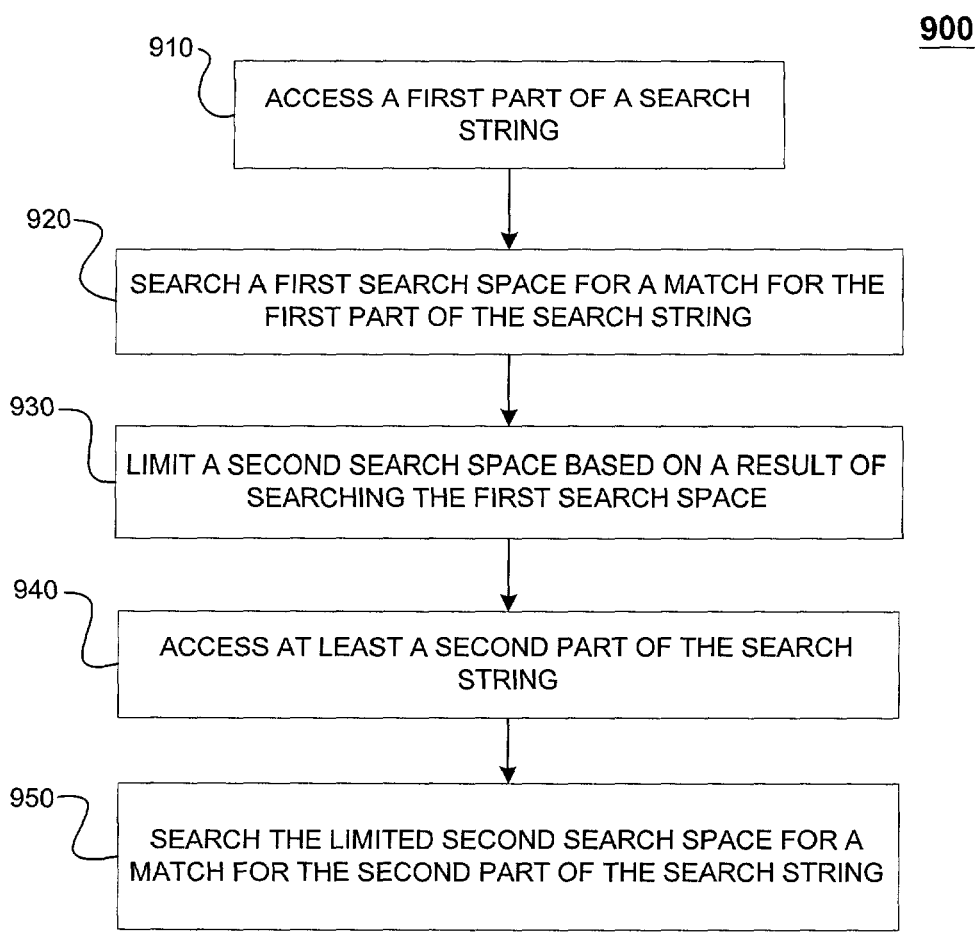
FIG. 9 is a flow chart of a process for searching for one or matches to a search string.

Referring to FIG. 9, a process 900 for searching for one or matches to a search string includes accessing at least a first part of a search string (910). Such accessing may include, for example, receiving a voice input, a stylus input, or a menu selection, and the first part may include the entire search string.

The process 900 includes searching a first search space for a match for the first part of the search string (920). The first search space may include, for example, a search space in a grammar of a voice recognition engine, a search space in a database, or a search space in a list of options presented to a user in a pull-down menu. Searching may include, for example, comparing text entries, voice waveforms, or codes representing entries in a codebook of vector-quantized waveforms.

The process 900 includes limiting a second search space based on a result of searching the first search space (930). The second search space may, for example, be similar to or the same as the first search space. Limiting may include, for example, paring down the possible grammar or vocabulary entries that could be examined, paring down the possible database entries that could be examined, or paring down the number of options that could be displayed or made available for a parameter of the search string. And paring down the possibilities or options may be done, for example, so as to exclude possibilities or options that do not satisfy the first part of the search string.

The process 900 includes accessing at least a second part of the search string (940) and searching the limited second search space for a match for the second part of the search string (950). Accessing the second part of the search string may include, for example, receiving a voice input, a stylus input, or a menu selection, and the second part may include the entire search string. Searching the limited second search space may be performed, for example, in the same way or in a similar way as searching the first search space is performed. As suggested by the discussion of this paragraph and the preceding paragraphs, the process 900 is intended to cover all of the disclosed processes.

Figure 10:
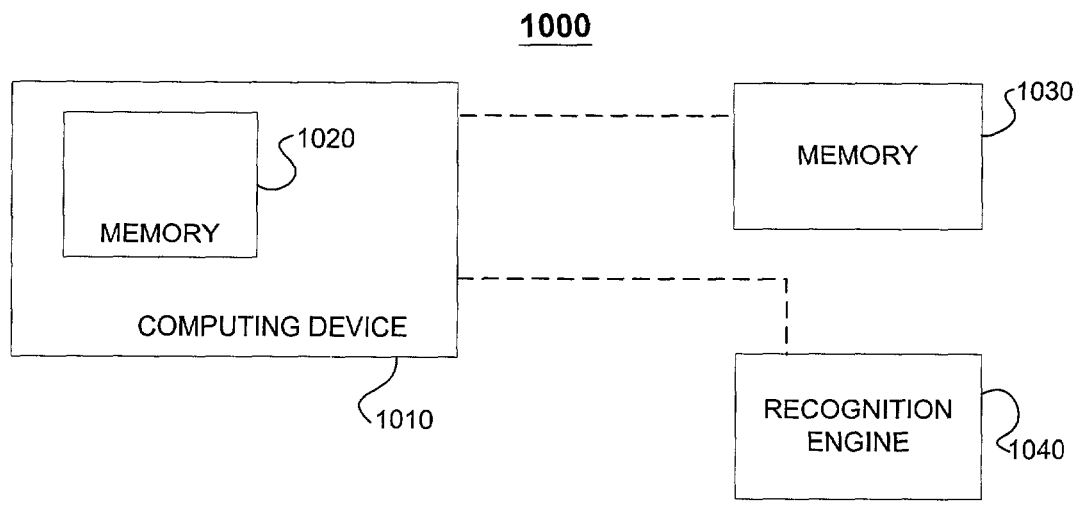
FIG. 10 is a block diagram of a system for performing one or more of the described processes.

Referring to FIG. 10, a system 1000 for implementing one or more of the above processes includes a computing device 1010, a first memory 1020 located internal to the computing device 1010, a second memory 1030 located external to the computing device 1010, and a recognition engine 1040 located external to the computing device 1010. The computing device may be, for example, a desktop, laptop, palmtop, or other type of electronic device capable of performing one or more of the processes described. The first and second memories 1020, 1030 may be, for example, permanent or temporary memory capable of storing data or instructions at least temporarily. The recognition engine 1040 may be a voice recognition engine or a recognition engine for another mode of input. The second memory 1030 and the recognition engine 1040 are shown as being external to, and optionally connected to, the computing device 1010. However, the second memory 1030 and the recognition engine 1040 may also be integrated into the computing device 1010 or be omitted from the system 1000.

A number of implementations have been described. Nevertheless, it will be understood that various modifications may be made. For example, the operations of the disclosed processes need not necessarily be performed in the order(s) indicated. Accordingly, other implementations are within the scope of the following claims.

What is claimed is:

1. A method comprising:
    accessing a search string that includes a first component and a second component;
    parsing the search string into the first component and the second component;
    performing a first search for the first component using a global search space, simultaneous to parsing the search string into the first component and the second component;
    outputting a first solution space based on performing the first search using the global search space, the first solution space being a dynamically-limited subset of the search space;
    performing, at least partially in parallel with performing the first search using the global search space, a second search for the second component using the first solution space, the second search being peformed simultaneous to parsing the search string into the first component and the second component and simultaneous to outputting at least a portion of the first solution space;
    outputting a second solution space based on performing the second search using the first solution space, the second solution space being a dynamically-limited subset of the first solution space and the second solution space being output after outputting the first solution space;
    performing, at least partially in parallel with performing the second search, a third search on a combination of the first component and the second component using the second solution space, the third search being performed simultaneous to outputting at least a portion of the second solution space; and
    outputting a third solution space based on performing the third search, the third solution space being a dynamically-limited subset of the first solution space and the second solution space, and the third solution space being output after outputting the second solution space.

2. The method of claim 1 wherein performing the first search using the global search space further comprises searching a database.

3. The method of claim 1 wherein the second component comprises a voice segment.

4. The method of claim 1 wherein the second component comprises a manual mode input.

5. The method according to claim 1 wherein the search string comprises an address.

6. The method of claim 1:
    wherein performing the first search using the global search space further comprises performing a first voice recognition on the first component;
    wherein performing the second search using the first solution space further comprises performing a second voice recognition on the second component using the first solution space; and
    wherein the first solution space includes grammar entries associated with the first component.

7. The method of claim 6 wherein the grammar entries associated with the first component comprise grammar entries for a second search string, the second search string including at least the first component.

8. The method of claim 6 wherein:
    performing voice recognition on the first component produces a first recognized string, and the recognized string is associated with a plurality of recognized search strings from the search space; and
    performing the second search further comprises searching a portion of the first solution space associated with the plurality of recognized search strings.

9. The method of claim 6 wherein performing voice recognition on the second component of the voice segment further comprise comparing the second component to a set of high-occurrence patterns in the first solution space, and comparing the second component to a set of low-occurrence patterns in the first solution space.

10. The method of claim 6 further comprising:
    performing voice recognition on the voice segment using the second solution space.

11. The method of claim 1 wherein:
    the first component is associated with a set of searchable entries; and
    each entry in the first solution space is associated with one or more entries in the set of searchable entries.

12. The method of claim 1 wherein the method further comprises:
    providing a first set of options to a user, the first set of options relating to the first component, and being provided to the user in a page;
    accepting a first input from the user, the first input being selected from the first set of options;
    limiting a second set of options based on the first input, the second set of options relating to the second component;
    providing the second set of options to the user in the page, such that the user is presented with a page that provides the first set of options and the second set of options; and
    accepting a second input from the user, the second input being selected from the second set of options.

13. The method of claim 12 wherein accepting the first input further comprises:
    accepting a first voice input; and
    performing voice recognition on the first input.

14. The method of claim 12 wherein the first set of options comprises manufacturer designations and the second set of options comprises product designations from a manufacturer designated by the first input.

15. The method according to claim 12 wherein the search string comprises an address.

16. The method of claim 12 further comprising:
providing a third set of options to the user, the third set of options relating to a third component and being provided to the user in the page; and
accepting a third input from the user, the third input being selected from the third set of options,
wherein the second set of options that is provided to the user is also based on the accepted third input.

17. The method of claim 16 further comprising modifying the second set of options based on the third input.

18. The method of claim 16 wherein:
the first set of options comprises manufacturer designations;
the third set of options comprises price range designations; and
the second set of options comprises product designations from a manufacturer designated by the first input in a price range designated by the third input.

19. The method of claim 1 wherein:
the first component comprises a first whole word, and
the second component comprises a second whole word.

20. An apparatus comprising:
an input module configured to access a search string that includes a first component and a second component;
a processor configured to:
parse the search string into the first component and the second component,
perform a first search for the first component using a global search space, simultaneous to parsing the search string into the first component and the second component,
output a first solution space based on performing the first search using the global search space, the first solution space being a dynamically-limited subset of the search space,
perform, at least partially in parallel with performing the first search using the global search space, a second search for the second component using the first solution space, the second search being performed simultaneous to parsing the search string into the first component and the second component and simultaneous to outputting at least a portion of the first solution space,
output a second solution space based on performing the second search using the first solution space, the second solution space being a dynamically-limited subset of the first solution space and the second solution space being output after outputting the first solution space, and
perform, at least partially in parallel with performing the second search, a third search on a combination of the first component and the second component using the second solution space, the third search being performed simultaneous to outputting at least a portion of the second solution space; and
an output module configured to output a third solution space based on performing the third search, the third solution space being a dynamically-limited subset of the first solution space and the second solution space, and the third solution space being output after outputting the second solution space.

21. A computer program product, tangibly embodied in a machine-readable medium, the computer program product comprising instructions that, when read by a machine, operate to cause a data processing apparatus to:
access a search string that includes a first component and a second component;
parse the search string into the first component and the second component;
perform a first search for the first component using a global search space, simultaneous to parsing the search string into the first component and the second component;
output a first solution space based on performing the first search using the global search space, the first solution space being a dynamically-limited subset of the search space;
perform, at least partially in parallel with performing the first search using the global search space, a second search for the second component using the first solution space, the second search being performed simultaneous to parsing the search string into the first component and the second component and simultaneous to outputting at least a portion of the first solution space;
output a second solution space based on performing the second search using the first solution space, the second solution space being a dynamically-limited subset of the first solution space and the second solution space being output after outputting the first solution space;
perform, at least partially in parallel with performing the second search, a third search on a combination of the first component and the second component using the second solution space, the third search being performed simultaneous to outputting at least a portion of the second solution space; and
output a third solution space based on performing the third search, the third solution space being a dynamically-limited subset of the first solution space and the second solution space, and the third solution space being output after outputting the second solution space.

* * * * *